United States Patent
Delsuc

(10) Patent No.: US 9,191,481 B2
(45) Date of Patent: Nov. 17, 2015

(54) METHOD AND TERMINAL FOR COMMUNICATING DATA WITH A WIRELESS DEVICE

(71) Applicant: GEMALTO SA, Meudon (FR)

(72) Inventor: Julien Delsuc, La Ciotat (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/369,440

(22) PCT Filed: Dec. 28, 2012

(86) PCT No.: PCT/EP2012/077096
§ 371 (c)(1),
(2) Date: Jun. 27, 2014

(87) PCT Pub. No.: WO2013/098414
PCT Pub. Date: Jul. 4, 2013

(65) Prior Publication Data
US 2015/0017949 A1    Jan. 15, 2015

(30) Foreign Application Priority Data

Dec. 29, 2011 (EP) .................................... 11306810

(51) Int. Cl.
*H04M 1/725* (2006.01)
*H04W 12/04* (2009.01)
*H04W 12/06* (2009.01)

(52) U.S. Cl.
CPC ............ *H04M 1/7253* (2013.01); *H04W 12/04* (2013.01); *H04W 12/06* (2013.01); *H04M2250/02* (2013.01); *H04M 2250/04* (2013.01); *H04M 2250/06* (2013.01); *H04M 2250/52* (2013.01)

(58) Field of Classification Search
CPC .......... H04M 1/7253; H04M 2250/02; H04M 2250/04; H04W 12/04; H04W 12/06; G06Q 10/06398; G06Q 20/10; G06Q 40/02; H04N 21/8173

USPC ................... 455/411, 41.2, 556.1; 705/14.64; 709/205

See application file for complete search history.

(56) References Cited

U.S. PATENT DOCUMENTS

| | | | |
|---|---|---|---|
| 2009/0176505 A1 | 7/2009 | Van Deventer et al. | |
| 2009/0185763 A1 | 7/2009 | Park et al. | |
| 2011/0124287 A1 | 5/2011 | Bang et al. | |
| 2012/0005026 A1* | 1/2012 | Khan et al. ................. | 705/14.64 |
| 2012/0023171 A1* | 1/2012 | Redmond ..................... | 709/205 |

FOREIGN PATENT DOCUMENTS

EP    2 073 515 A1    6/2009

OTHER PUBLICATIONS

International Search Report (PCT/ISA/210) mailed on Feb. 19, 2013, by the European Patent Office as the International Searching Authority for International Application No. PCT/EP2012/077096.

* cited by examiner

*Primary Examiner* — Phuoc H Doan
(74) *Attorney, Agent, or Firm* — Buchanan Ingersoll & Rooney PC

(57) ABSTRACT

A wireless device presents a predetermined identifier and at least one code comprising connection data. A terminal communicates over a short range radio-frequency link, with a wireless device. The terminal has a camera and a display screen. The terminal detects, through the camera, an identifier relating to a wireless device in a vicinity of the terminal. The terminal presents, through the display screen, at least one object for each detected identifier, the object being associated with a wireless device. A terminal user selects, through the display screen, one object amongst the presented objects. The terminal reads or extracts the connection data comprised within the selected code associated with the corresponding selected wireless device. And the terminal establishes, a connection, over the short range radio-frequency link, to the corresponding selected wireless device.

10 Claims, 1 Drawing Sheet

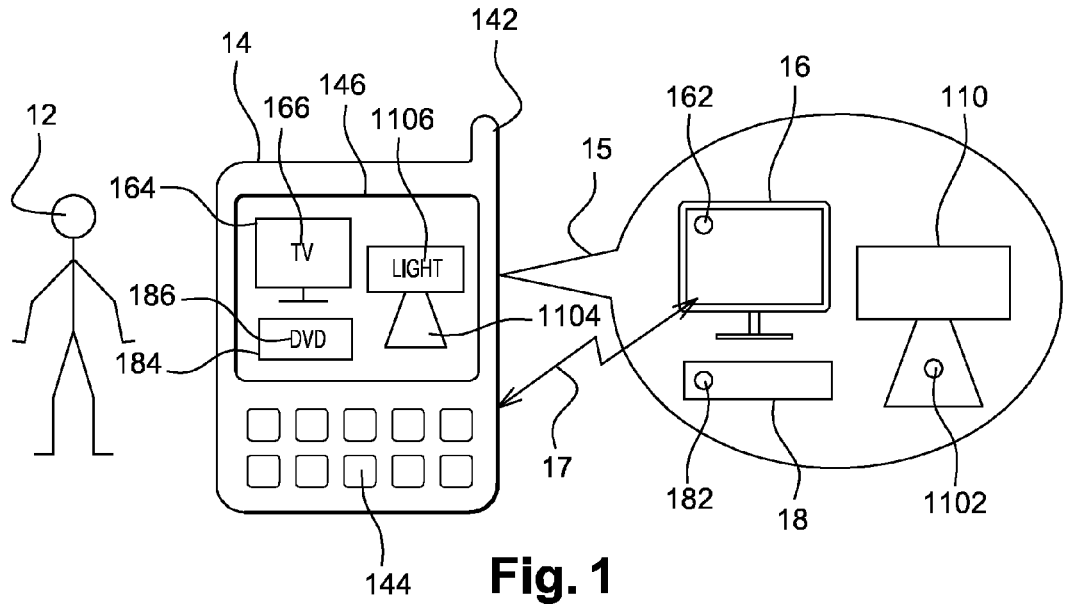
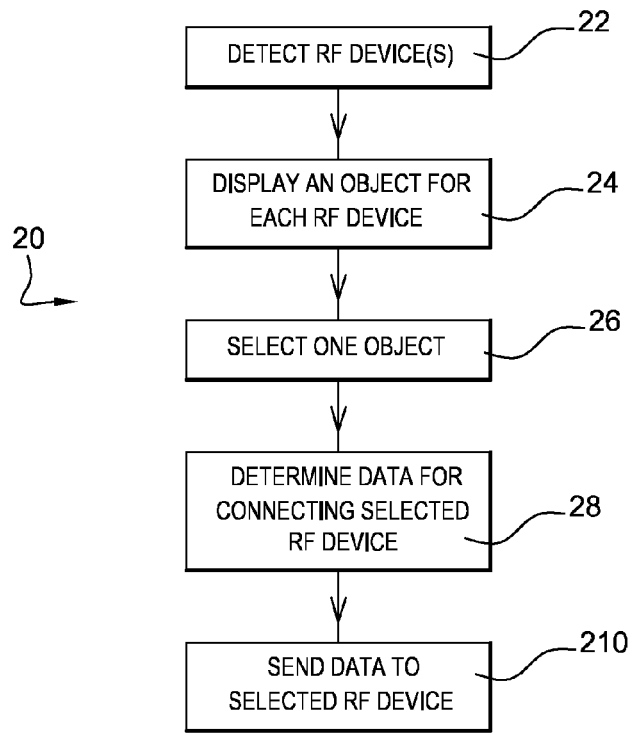

METHOD AND TERMINAL FOR COMMUNICATING DATA WITH A WIRELESS DEVICE

FIELD OF THE INVENTION

The invention relates, in a general manner, to a method for communicating data with a wireless device.

Furthermore, the invention also pertains to a terminal for communicating data with a wireless device.

Within the present description, the adjective "wireless" used within the expression "wireless device" means that the device communicates notably via a short (distance) range Radio-Frequency (or RF) link by using, for example, Institute of Electrical and Electronic Engineers (IEEE) standard specifications 802.15 and 802.11, International Organization for Standardization/International Electrotechnical Commission (or ISO/IEC) 14 443 specifications and/or the like.

STATE OF THE ART

There are more and more Bluetooth (registered Trademark) (enabled) devices, such as mobile handsets, Personal Computers (or PC), TeleVision (or TV) sets, vehicles, printers, domestic apparatuses. Two Bluetooth devices, as wireless devices, exchange, over an RF link, data when they are under a short distance range.

There is a need to provide a solution that allows to initiate a local connection, over an RF link, with another device, as a wireless device.

SUMMARY OF THE INVENTION

The invention proposes a solution for satisfying the just herein above specified need by providing a method for communicating data with a wireless device.

According to the invention, at least one wireless device presenting, each, a predetermined identifier and at least one code, the at least one code comprising connection data, a terminal being connected to or comprising means for communicating, over a short range radio-frequency link, with a wireless device, the terminal comprising or being connected to at least one camera and at least one display screen, the method comprises the following steps:

the terminal detects, through at least one camera, at least one identifier relating to at least one wireless device in a vicinity of the terminal, the at least one identifier being situated in front of the at least one camera;

the terminal presents, through at least one display screen, at least one object for each detected identifier, the at least one object being associated with a wireless device;

a terminal user selects, through at least one display screen, one object amongst the at least one presented object;

the terminal reads or extracts the connection data comprised within the selected code associated with the corresponding selected wireless device; and the terminal establishes a connection, over the short range radio-frequency link, to the corresponding selected wireless device.

The principle of the invention consists in using a terminal accessing, on the one hand, a camera(s) to find a predefined marker or identifier indicating a presence of a corresponding wireless device at the terminal side and, on the other hand, a display screen(s) for displaying an object associated with each found marker, so as to choose the object with which the terminal has to communicate. Then, the terminal reads a code exposed by the chosen wireless device to determine data for connecting to the concerned wireless device. At last, the terminal initiates, with the help of the determined connection data, a local RF data communication with the chosen wireless device.

Thus, the terminal enables to connect, locally, the terminal, over an RF link, to a chosen wireless device.

It is to be noted that an identifier or marker relating to a wireless device may be of any type.

Likewise, the invention does not impose any constraint for an object relating to a wireless device that appears on the display screen.

The invention allows discovering, thanks to its (their) respective identifier(s), one or several present wireless devices and establishing, in a simple manner, a communication with one wireless device among the one(s) represented each by a corresponding displayed object(s).

According to a further aspect, the invention is a terminal for communicating data with a wireless device.

According to the invention, at least one wireless device presenting, each, a predetermined identifier and at least one code, the at least one code comprising connection data, the terminal being connected to or comprising means for communicating, over a short radio-frequency link, with a wireless device, the terminal comprising or being connected to at least one camera and at least one display screen, the terminal is adapted to:

detect, through at least one camera, at least one identifier relating to at least one wireless device in a vicinity of the terminal, the at least one identifier being situated in front of the at least one camera;

present, through at least one display screen, at least one object for each detected identifier, the at least one object being associated with a wireless device;

read or extract, further to a terminal user selection, through at least one display screen, of one object amongst the at least one presented object, the connection data comprised within the selected code associated with the corresponding selected wireless device; and establish a connection, over the short range radio-frequency link, to the corresponding selected wireless device.

The terminal includes a portable device, such as a handheld computer, like a mobile (tele)phone, a Personal Digital Assistant (or PDA), a Voice over Internet Protocol handset, a netbook, a tablet and/or a mobile laptop.

For instance, the terminal may include a set-top box, a desktop computer, a Personal Computer (or PC), a media player, a game console, and/or a TeleVision (or TV) set.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings:

FIG. 1 illustrates an exemplifying simplified diagram of a mobile phone, as terminal, the terminal being arranged so that the terminal initiates, thanks to connection data included within a code presented by an RF (communicating) device, an RF connection to the RF device selected among several displayed representatives of RF devices captured by a camera, according to the invention; and FIG. 2 represents one flow chart of an exemplifying method for communicating with an RF device, as wireless device, from the terminal of FIG. 1.

DETAILED DESCRIPTION

Herein under is considered a case in which the invention method for communicating with a wireless device is implemented by a mobile phone, as terminal.

Naturally, the herein below described embodiment is only for exemplifying purposes and is not considered to reduce the scope of the invention.

FIG. 1 shows schematically a mobile phone 14 carried by a user 12, a TV set 16, a Digital Video Disc (DVD) player 18 and a lamp 110, which are all present in one and a same place, like a room.

For sake of simplicity, the mobile phone 14, the TV set 16, the Digital Video Disc (DVD) player 18 are termed hereinafter the phone 14, the TV 16 and the DVD 18.

The phone 14 is a user terminal.

As to the terminal, it may be any device including means for processing data (not represented), comprising or being connected to RF communicating means including at least one antenna (not represented) for sending to and/or receiving data from outside over a short range RF link, comprising or being connected to means for interfacing with a user, as Man Machine Interface (or MMI), and comprising means (not represented) for storing data.

The phone 14 comprises preferentially a battery(ies).

The phone 14 includes, at least one microprocessor (not represented), as data processing means, volatile and non-volatile memories (not represented), as storing means, and Input/Output (or I/O) interfaces linked all together through a control and data bus (not shown).

The phone microprocessor processes and controls data within the phone 14 and/or data to be exchanged with outside of the phone 14. The microprocessor controls and communicates with all the components of the phone 14.

The phone 14 comprises means for communicating, over the air (or OTA), via a long range RF bi-directional link, through a communication network, with a remote network server (not represented). The phone means for communicating remotely contains an OTA antenna 142.

The phone 14 includes preferably, as MMI, a keyboard 144 and a display screen 146.

Alternatively, instead of a display screen, the phone 14 is equipped with a touch sensitive display screen.

According to another embodiment, the phone 14 comprises two or more display screens.

According to still another embodiment, the phone 14 is connected to one or several display screens.

The memories store data notably relating to an Operating System (or OS) and at least one application supported by the phone 14.

The phone 14 includes preferably one or several cameras (not represented).

Alternately, the phone 14 is connected to an external camera(s).

The phone 14 includes means for communicating, over a short range RF link, as RF communicating means (not represented). The phone RF communicating means comprises one or several antennas (not represented) so as to communicate, at a short distance, with an external device(s), like the TV 16, the DVD 18 and/or the lamp 110.

Alternatively, instead of integrating the RF communicating means, the phone is connected to RF communicating means.

The phone RF communicating means communicates via one or several short range RF link(s) 17 that may have a range that is more or less short. The short range radio-frequency(ies) may be fixed at 13.56 MHz (for Near Field Communication or NFC) with a range of about 20 cm, from around 2.4 GHz to around 10 GHz (for Ultra Wide Band or UWB e.g. IEEE 802.15.4a), at 2.4-2.5 GHz with a range of about 10 m to 100 m (for Zigbee (e.g. IEEE 802.15.4), Wifi and Bluetooth or Bluetooth low energy (e.g. IEEE 802.15.1)), and/or other frequency value(s) allowing to communicate at a short range (typically from about 20 cm to 800 m). The short range RF link 17 is preferably bi-directional, i.e. that enables to exchange data in two ways between the phone 14 and an external entity(ies), like the TV 16, the DVD 18 and/or the lamp 110.

The phone memories stores non-executable data and executable data.

The phone memory(ies) may store one or several user profiles for one or several users. A main user of the phone 14 is an owner of the phone 14. Other user(s), like a member(s) of the main user family, may also be able, preferably having been identified and/or authenticated, to use the phone 14, so as to trigger an establishment of a local RF connection to a wireless device. Each user may have one or several user profiles. A user profile may be used for accessing one or several services accessible from or through a wireless device(s), like the TV 16, the DVD 18 the lamp 110, a network access point (not represented), like a hotspot, a MiFi, a Femtocell. The network access point is connected to a remote entity(ies), like a remote server(s).

Each wireless device presents a predefined identifier (not represented) that is detectable by a camera. The predefined identifier allows preferably to distinguish a type of wireless device from another type of wireless device.

The camera has a range sufficient so that the phone 14 detects any identifier that is situated in front of the camera. The identifier may include, as visual clue(s), a logo(s), like a Bluetooth logo, an image(s), a picture(s) and/or a mark(s). The phone 14 stores an identifier of each wireless device and an associated object to be presented for each detected identifier. The camera records and stores one or several images that may be static, i.e. a photo, or dynamic, i.e. a movie.

Each wireless device presents one or several codes. The code may constitute an identifier of the wireless device. The code may be a barcode, a Quick Response (or QR) code or a bokode, as a type of data tag which contains more information than a barcode. For instance, the TV 16 presents a first code 162, the DVD 18 presents a second code and a lamp 110 presents a third code 1102.

At least one code includes, as connection data, data for connecting, over a short range RF link, to the corresponding wireless device. The code is detectable by a camera. The code is readable through the camera.

The phone 14 supports an invention application.

Alternately, instead of the phone memories, a memory(ies) of a token (not represented) that is coupled to the phone 14 is(are) used for storing non-executable data and executable data. The token may be removable or fixed (e.g. soldered to) to the phone 14. The token memory(ies) store(s) preferably a Personal Identity Number (or PIN) or the like, as user authentication data. The token memory(ies) store(s) preferably biometric data, like a fingerprint(s), an iris print(s) and/or a face print(s), as user identification data. The token is thus able to identify and/or authenticate a user.

As non-executable data, once read (or extracted) from a code, the phone memories store connection data allowing to establish, over a short RF link, a communication with a wireless device presenting the code.

The connection data includes an address identifier, like a Media Access Control (or MAC) address for Bluetooth or Service Set IDentification (or SSID) for Wifi, and/or a key, like a Bluetooth key for Bluetooth or a Wireless Equivalent Privacy (or WEP) key for Wifi.

Each of the wireless devices in the range of the phone camera is detected and represented on the display screen 146 by an object that is predefined.

The TV 16, the DVD 18 and the lamp 110 are present in the environs of the phone 14 and situated in front of the camera.

The phone microprocessor executes preferably a security function(s), in order to protect access to information managed through or by the phone 14.

The security functions may include an encryption/decryption process to be used before sending to/after receiving from the phone 14 data, so as to protect access to data thus exchanged between the phone 14 and an external RF device, like the TV 16, the DVD 18 or the lamp 110.

Each wireless device includes means for communicating, over a short range RF link, as RF communicating means (not represented). The wireless device RF communicating means comprises one or several antennas (not represented) so as to communicate, at a short distance, with an external device(s), like the phone 14.

Alternatively, instead of integrating the RF communicating means, the wireless device is connected to RF communicating means.

The wireless device RF communicating means communicates over one or several short range RF link(s) 17 that may have a range that is more or less short. The short range radio-frequency(ies) may be fixed at 13.56 MHz (for Near Field Communication or NFC) with a range of about 20 cm, from around 2.4 GHz to around 10 GHz (for Ultra Wide Band or UWB e.g. IEEE 802.15.4a), at 2.4-2.5 GHz with a range of about 10 m to 100 m (for Zigbee (e.g. IEEE 802.15.4), Wifi and Bluetooth or Bluetooth low energy (e.g. IEEE 802.15.1)), and/or other frequency value(s) allowing to communicate at a short range (typically from about 20 cm to 800 m).

The phone 14 and each of the wireless devices are sufficiently close to each other so that the phone 14 is able to establish a connection, over a short range RF link, with a target (or destination) device. To establish such a connection, the phone 14 uses data for connecting to the target device provided by a code carried by the target device. The target device is the one selected by the phone 14.

FIG. 2 depicts an exemplary embodiment of the invention method 20 for communicating data with a wireless device to be chosen from the phone 14.

It is assumed that the phone user 12 selects the invention application and the phone camera captures the scene in front of it.

Optionally, the phone 14 (or a token coupled to the phone 14) verifies whether the user is identified, as authorized user, by comparing her/his biometric data with stored reference biometric data. If the user is not identified as authorized user, then the phone 14 forbids to go further possibly while informing the user that she/he is not an authorized user. If the user is identified as authorized user, then the phone 14 authorizes to go to the next following step.

The phone 14 detects 22, through the camera, one or several identifiers relating to one or several wireless devices in the vicinity of the phone 14.

The phone 14 presents 24, through the display screen 146, one or several objects for each detected identifier.

The object is associated with a wireless device and a corresponding detected identifier. The object represents, on the display screen 146, the associated wireless device. According to one embodiment, the object includes a written name for designating the corresponding detected wireless device or a service provided by the corresponding captured wireless device, like, for a displayed TV picture 164, TV 166, for a displayed DVD picture 184, DVD 186, and, for a displayed lamp picture 1104, LIGHT 1106. The object includes a picture, like an icon, as graphics data, that represents, possibly in a reduced format or size, the captured or detected wireless device associated with the detected identifier.

Each presentation of an object includes an overlay of the object on a displayed image relating to a corresponding wireless device. Such a presentation technique is also known as "augmented reality".

The phone 14 selects 26 one object amongst one or several presented objects. Such a selection is preferably carried out further to a selection of one object by a user through the phone MMI. A user selection includes a touch on a touch-sensitive display screen of the concerned displayed object.

Once the phone 14 has fetched (or read) and analyzed the selected code presented by the corresponding wireless device, the phone 14 determines 28 connection data comprised within the selected code associated with the corresponding selected wireless device.

Optionally, the phone 14 verifies whether the user profile does or does not allow to access data managed by or through the corresponding selected wireless device. If the user profile does not allow to access the corresponding selected wireless device, then the phone 14 forbids to go further possibly while informing the user that she/he is not allowed to access the selected wireless device. If the user profile allows to access the corresponding selected wireless device, then the phone 14 authorizes to go further.

Then, the phone 14 sends 210, thanks to the determined connection data, data, over a short range RF (or wireless) link 17, to the corresponding selected wireless device. The short range RF link may be related to Bluetooth, Wifi, NFC, Zigbee or other technology.

Assuming that the phone 14 selects the object 166 relating to the TV 16, thanks to a reading of the first code 162 and a deduction of associated connection data, the phone 14 is thus able to interact, over the short range RF link 17, with the TV 16.

The described invention method allows to trigger, in a simple and intuitive manner from the phone 14, an establishment of a short RF communication with a selected wireless device.

Such an invention may be used for accessing either a local service provided by or through a locally situated wireless device or, through a local selected network access point, as wireless device, a remote service provided by a remote server.

The embodiment that has just been described is not intended to limit the scope of the invention. Other embodiments may be given.

The invention claimed is:

1. A method for communicating data with a wireless device,
wherein, (i) at least one wireless device presents, each, a predetermined identifier and at least one code, the at least one code comprising connection data relating to the wireless device, (ii) a terminal is connected to or comprises means for communicating, over a short range radio-frequency link, with the wireless device, the terminal comprising or being connected to at least one camera and at least one display screen, (iii) the method comprises the following steps:
detecting, by the terminal, through the at least one camera, at least one identifier relating to at least one wireless device in a vicinity of the terminal, the at least one identifier being situated in front of the at least one camera;

presenting, by the terminal, through at least one display screen, at least one object for each detected identifier, the at least one object being associated with a wireless device;

selecting, by a terminal user, through at least one display screen, one object amongst the at least one presented object;

detecting, by the terminal, through at least one camera, the at least one code associated with the selected object;

reading or extracting, by the terminal, the connection data comprised within the detected code associated with the corresponding selected wireless device; and establishing, by the terminal, over the short range radio-frequency link, a connection to the corresponding selected wireless device by using said connection data.

2. A method according to claim 1, wherein the at least one code includes at least one element of a group comprising a barcode, a Quick Response code, and a bokode.

3. A method according to claim 1, wherein the selected object is selected through a touch-sensitive display screen.

4. A method according to claim 1, wherein the connection data includes at least one element of a group comprising an address and a key.

5. A method according to claim 1, wherein, prior to an establishment of a connection between the terminal and the corresponding selected wireless device, the method further includes a user identification step and/or a user authentication step.

6. A method according to claim 5, wherein, a token being coupled to the terminal, the token storing user identification data and/or user authentication data, the token carries out the user identification step and/or the user authentication step.

7. A method according to claim 1, wherein the identifier includes at least one logo, at least one image, at least one picture and/or at least one mark.

8. A method according to claim 1, wherein the method further comprises at least one user profile verification step by which the terminal verifies whether the user profile does or does not allow to access data managed by or through the wireless device.

9. A method according to claim 1, wherein a presentation, through the display screen, of each object includes an overlay of the object on a displayed image relating to a corresponding wireless device.

10. A terminal for communicating data with a wireless device, wherein, (i) at least one wireless device presents, each, a predetermined identifier and at least one code, the at least one code comprising connection data relating to the wireless device, (ii) the terminal is connected to or comprises means for communicating, over a short radio-frequency link, with a wireless device, the terminal comprising or being connected to at least one camera and at least one display screen, and (iii) the terminal is configured to:

detect, through the at least one camera, at least one identifier relating to at least one wireless device in a vicinity of the terminal, the at least one identifier being situated in front of the at least one camera;

present, through at least one display screen, at least one object for each detected identifier, the at least one object being associated with a wireless device;

select, further to a terminal user selection, through at least one display screen, one object amongst the at least one presented object;

detect, through at least one camera, the at least one code associated with the selected object;

read or extract the connection data comprised within the detected code associated with the corresponding selected wireless device; and establish, over the short range radio-frequency link, a connection to the corresponding selected wireless device by using the connection data.

\* \* \* \* \*